(12) United States Patent
Rayburn

(10) Patent No.: US 7,031,714 B1
(45) Date of Patent: Apr. 18, 2006

(54) METHOD AND SYSTEM FOR MANAGING COMMUNICATION BASED ON LOCATION

(75) Inventor: Terry Rayburn, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 454 days.

(21) Appl. No.: 09/991,159

(22) Filed: Nov. 14, 2001

(51) Int. Cl.
- *H04Q 7/20* (2006.01)
- *H04M 11/04* (2006.01)
- *H04M 3/42* (2006.01)
- *H04M 1/00* (2006.01)
- *H04B 1/38* (2006.01)

(52) U.S. Cl. .................. 455/445; 455/404.2; 455/417; 455/453; 455/456.1; 455/456.5; 455/550.1; 455/560; 455/569.2; 379/211.01

(58) Field of Classification Search .. 455/404.1–404.2, 455/403, 417, 445, 446, 447, 448, 449, 450, 455/451, 452.1, 452.2, 453, 456.1, 456.2, 455/456.3, 456.5, 456.6, 458, 459, 550.1, 455/422.1, 560, 561, 567, 569.2; 379/35, 379/37, 112.04, 112.05, 45–46, 142.07, 142.1, 379/142.11, 211.1, 211.02; 340/902, 7.46, 340/7.47

See application file for complete search history.

(56) References Cited

U.S. PATENT DOCUMENTS

| | | | | |
|---|---|---|---|---|
| 5,291,550 A | * | 3/1994 | Levy et al. | 379/242 |
| 5,323,444 A | * | 6/1994 | Ertz et al. | 379/45 |
| 5,404,350 A | * | 4/1995 | DeVito et al. | 370/217 |
| 5,530,744 A | * | 6/1996 | Charalambous et al. | 379/266.08 |
| 5,596,625 A | * | 1/1997 | LeBlanc | 455/404.2 |
| 5,797,093 A | * | 8/1998 | Houde | 455/404.1 |
| 6,009,163 A | * | 12/1999 | Nabkel et al. | 379/266.01 |
| 6,115,598 A | * | 9/2000 | Yu | 455/404.1 |
| 6,233,445 B1 | * | 5/2001 | Boltz et al. | 455/404.2 |
| 6,389,128 B1 | * | 5/2002 | Stademann | 379/221.01 |
| 6,697,480 B1 | * | 2/2004 | Plunkett et al. | 379/221.02 |
| 6,813,246 B1 | * | 11/2004 | Phan et al. | 370/238 |

OTHER PUBLICATIONS

TR-45, Enhanced Wireless 9-1-1 Phase 2, PN-3890-AD-1, 66 pgs. (Dec. 2000).
TR-45, Enhanced Wireless 9-1-1 Phase 2, J-STD-036, 222 pgs. (Jul. 2000).

* cited by examiner

*Primary Examiner*—William Trost
*Assistant Examiner*—Meless Zewdu

(57) ABSTRACT

A method and system for managing communications based on originating location. A network entity maintains or has access to a log of the originating locations of calls placed to a given destination. In turn, when another call is placed to the given destination, the network entity refers to the log to determine whether more than a threshold number of calls have been placed to that destination in the past predetermined time period. If so, then the network entity causes the call to be routed to an alternate destination for alternate handling. The invention is particularly useful to help reduce the possibility of overloading emergency call centers when many mobile callers call from a common location to report an emergency.

26 Claims, 4 Drawing Sheets

METHOD AND SYSTEM FOR MANAGING COMMUNICATION BASED ON LOCATION

BACKGROUND

1. Field of the Invention

The present invention relates to mobile communications and, more particularly, to communications between mobile stations and emergency service providers.

2. Description of Related Art

The advent and growth of wireless communications has ushered in a new era of convenience and productivity. Interactions that once commonly required a landline connection to a communications network are now possible with seeming disregard for physical location and physical connections. Today, it is possible for a user operating a suitable mobile terminal to engage in both voice and data communications at virtually any location. Personal and business communications can therefore be conducted more quickly and with far fewer restrictions than previously possible.

The widespread use of mobile stations (such as cellular telephones and personal digital assistants ("PDAs") for instance), however, has been a mixed blessing for emergency service providers, such as 911 centers.

In the past, calls to 911 centers would originate strictly from landline telephones associated with fixed locations such as houses or places of business. Pursuant to government regulations, when a telephone carrier connects such a landline call to a 911 center, the carrier must provide the 911 center with an indication of where the caller is located, as indicated by static directory tables. When a person would call a 911 center from a mobile station, however, a carrier would not provide the 911 center with the caller's location, so the 911 center would not be able to readily find the caller. On the other hand, provided with a mechanism to identify the location of a mobile 911 caller, emergency services would be able to quickly find and respond to emergencies in remote locations.

In the mid-1990s, the United States Federal Communications Commission ("FCC") addressed this problem, mandating the implementation of "Enhanced 911" ("E911") services. The E911 mandate was divided into two phases. According to Phase 1, a wireless cellular carrier would be obligated provide a 911 center with an indication of the cell and sector in which a mobile 911 caller is located. As this information is typically maintained by a wireless cellular carrier in a subscriber's home location register ("HLR"), Phase 1 presents little technical challenge. According to Phase 2, the location must be provided with an accuracy of at least 100 meters (or 50 meters for handset-originated methods), which is far more granular than the cell and sector information maintained in the HLR. In response, the Telecommunications Industry Association ("TIA") has proposed a new standard for "Enhanced Wireless 9-1-1, Phase 2," now entitled "Wireless Enhanced Emergency Services" or "TIA/EIA/IS-J-STD-036" (J-STD-036), the entirety of which is hereby incorporated by reference.

In order to achieve the accuracy specified by Phase 2, a cellular wireless network may employ special position determining equipment ("PDE") and techniques. Alternatively, a mobile station itself may employ a position determining system such as the global positioning system ("GPS") and may relay its position to the network, for reference by the emergency services. The emergency services may then use the position of the mobile station to help assist a user of the mobile station.

The public is increasingly aware that it is now possible to place 911 calls from cellular telephones. At the same time, the popularity and pervasiveness of cellular telephones continues to grow. The end result is that, when an emergency occurs, 911 centers are often barraged with mobile 911 calls from people in the area of the emergency. For instance, if a car accident occurs on a crowded highway, many of the drivers who pass by the accident will call 911 from their cellular telephones, even though it would suffice for just one person to call.

Practically speaking, this presents a problem for 911 service providers. If a mass of calls comes in to a 911 center from a particular area, it is possible that other legitimate emergency calls from around that same area will be blocked (since the PSTN trunks or other transmission channels extending to or from the 911 center might be filled to capacity). For example, if a car accident occurs on a highway and many drivers on the scene call 911, a person suffering from a heart attack in a house adjacent to the accident scene may be unable to contact the 911 center.

Further, once a 911 center learns of an emergency situation that has occurred at a particular location, and particularly once the 911 center has received several calls reporting the emergency, chances are that the 911 center will have already dispatched emergency service personnel. It may therefore be unnecessary to trouble the 911 center with additional calls from the same location.

In view of this problem, a need exists for a method of handling heavy call loads to emergency service centers.

SUMMARY

As a general matter, the present invention relates to management of call traffic based on location. According to an exemplary embodiment of the invention, when a subscriber places a call to a given destination from a given geographic location, a telecommunications carrier (or other entity) will determine whether a threshold number of calls have already been placed to the destination from that location (or from an area around that location). If so, the carrier will route the call to an alternate destination instead of to the dialed destination. At the alternate destination, a determination may then be made whether to connect the call to the dialed destination, or other desired action may be taken.

The invention is particularly applicable in the context of emergency service calls and specifically as a mechanism for responding to what could otherwise be a temporary overload of an emergency communication system. In particular, according to an exemplary embodiment of the invention, a wireless carrier can monitor the rate of 911 calls placed from a given geographic location and, if the carrier determines that more than a threshold number of 911 calls are placed from the location per unit time, the carrier can redirect a subsequent 911 call from that location to a service platform.

The service platform can then apply alternate treatment to the subsequent 911 call. For example, the service platform can answer the call and play a message such as "We have already received many 911 calls from your location; if you are injured, please press any digit or hold for assistance. Otherwise, please hang up immediately." If the caller presses a digit, or if the caller does not hang up after a predetermined time period, the service platform may then re-route the call to a 911 service center.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
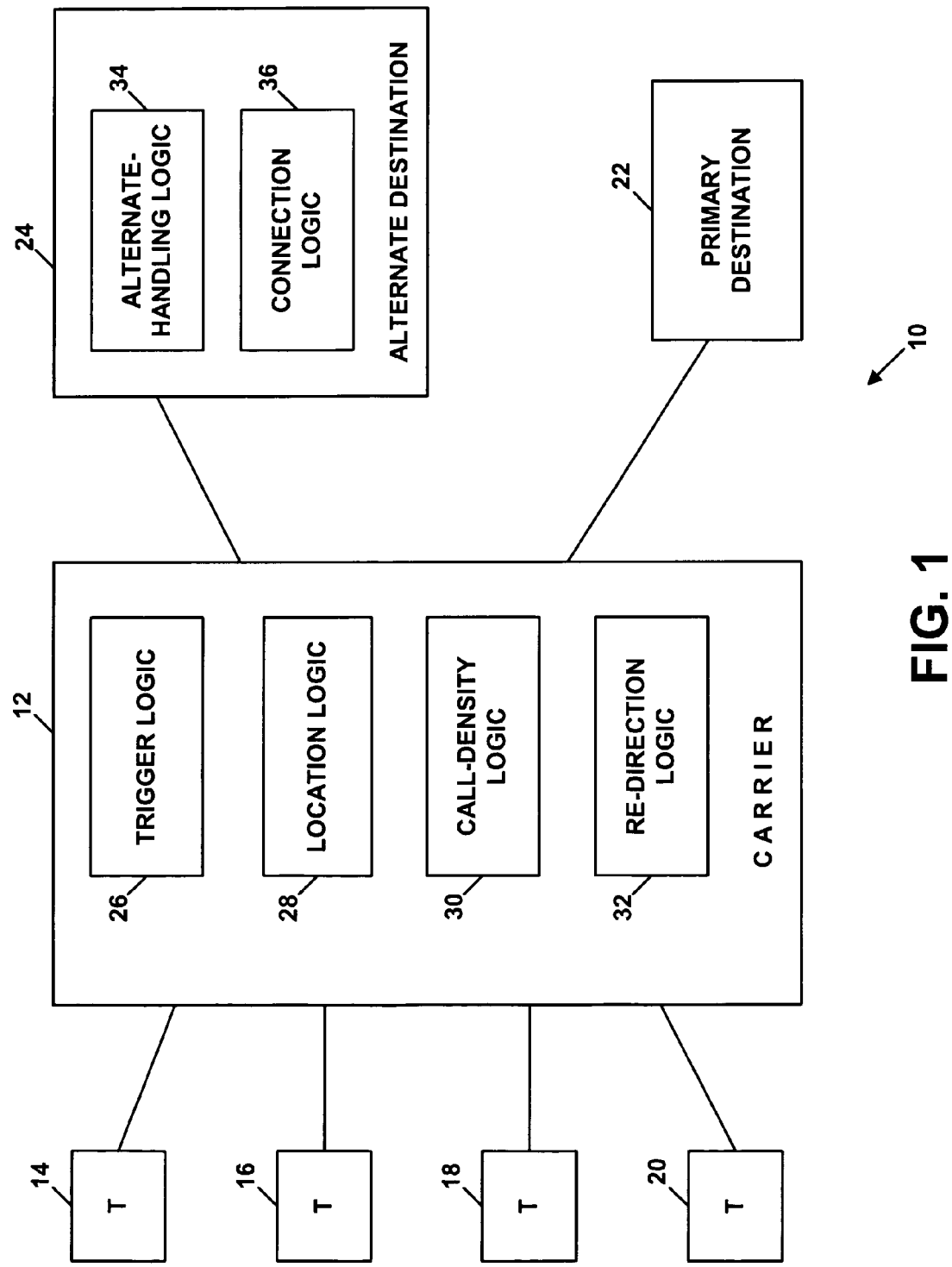
FIG. 1 is a simplified block diagram of a system arranged to implement the exemplary embodiment.

Referring to the drawings, FIG. 1 illustrates a simplified block diagram of a system 10 arranged to carry out an exemplary embodiment of the present invention. It should be understood that this and other arrangements and processes described herein are set forth for purposes of example only, and other arrangements and elements (e.g., machines, interfaces, functions, orders of elements, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location.

As shown in FIG. 1, system 10 includes a carrier system 12, which functions to interconnect endpoints so as to establish communication sessions. For purposes of example, the carrier system is shown coupled with a number of communication terminals ("T"), designated by reference numerals 14–20. Additionally, the carrier system is shown coupled with a primary destination 22 and an alternate destination 24.

As a general matter, carrier system 12 may thus receive a request from a given terminal 16 to connect a call to primary destination 22. In response, carrier system 12 will connect the call, thereby establishing a communication path between the given terminal T and the primary destination 22.

According to the exemplary embodiment, however, carrier system 12 further includes or has access to logic to facilitate re-directing such a call in response to a determination that a threshold number of calls have been placed to primary destination 22 from the location of terminal 16. In particular, as shown in FIG. 1, carrier system 20 preferably includes (i) trigger logic 26, (ii) location logic 28, (iii) call-density logic 30, and (iv) re-direction logic 32.

This logic preferably comprises software instructions stored in memory and executable by one or more processors. However, the logic can comprise firmware or hardware as well or instead. Further, the logic can be maintained and executed on one or more entities in carrier system 12 (or in other entities accessible to carrier system 12). For instance, the logic can be maintained and executed on a switch (e.g., signal switching point ("SSP") or mobile switching center ("MSC")) a network access server ("NAS"), a service control point ("SCP"), a home location register ("HLR") and/or an intelligent peripheral ("IP"). Other examples are possible as well.

In the exemplary embodiment, trigger logic 26 functions to detect that terminal 16 has requested a connection to primary destination 22. Typically, a user of terminal 16 will make this request by dialing digits, such as a telephone number of primary destination 22. In that instance, trigger logic 26 will function to detect the dialed digits. However, the request to connect to primary destination 22 may take other forms as well. For instance, in an arrangement where primary destination 22 has an associated IP network address or name and terminal 16 sends a request to establish a communication session with that IP address or name, trigger logic 26 may function to detect the IP address or name. Trigger-logic may produce a signal in response to detection of the requested connection.

Location logic 28 functions to determine or obtain the location of the originating terminal 16, in response to the signal produced by the trigger logic, for instance. The location is preferably a geographic position, such as latitude/longitude coordinates. However, the location may, alternatively, take other forms. For example, the location could be a street address and/or the name of an establishment (e.g., a store, a house, a floor, a park, etc.) in which the originating terminal is positioned. As another example, the location could be broadened out to be an area around or substantially where terminal 16 is positioned, such as an area within a predetermined radius of the position of terminal 16.

Location logic 28 may already have a record of a last known location of terminal 16. Alternatively, location logic 28 may employ any of a variety of position-determining technologies to determine the location of the terminal when the terminal requests connection to primary destination 22 or when otherwise desired.

Call-density logic 30, in turn, functions to determine whether a threshold number of calls (or other communication requests) have already been placed to primary destination 22 from the location of the originating terminal. In this regard, the location at issue is preferably broader than a specific geographic position (or other fairly precise position) of the terminal. Therefore, if location logic 28 established the location of the originating terminal to be specific latitude/longitude coordinates, call-density logic 30 will preferably consider substantially that location, such as an area within a particular radius of the location. For instance, if originating terminal 16 is located at coordinates h, k, call-density logic 30 can consider a circle of radius r around that point, encompassing all coordinates x, y that satisfy the equation:

$$SQR\{(x-h)^2+(y-k)^2\} \leq r$$

where the term "SQR" represents the square root function.

A determination of whether a threshold number of calls have already been placed to primary destination 22 from a given location can take various forms. For example, the determination can be a determination that at least a predetermined number of calls from the given location have been connected to primary destination 22 within a past predetermined window of time. As another example, the determination can be a determination that at least a predetermined number of calls have been connected to the primary destination 22 within a past predetermined window of time and have lasted more than a predetermined duration.

A measure of number of calls per unit time (or over a particular window of time) can be considered a call rate. Therefore, the determination that more than a threshold number of calls have already been placed to the primary destination from a given location can be a determination that at least a threshold rate of calls have been placed to the destination from that location. Other examples are possible as well.

To facilitate making a determination of whether a threshold number of calls have already been placed to the primary destination 22 from a given location, call-density logic (or other logic) may maintain a record of the originating location of at least each call connected to the primary destination, together with a record of the time of each call. In an exemplary embodiment, when originating terminal 16 requests a connection to the primary destination, call-density logic may then refer to the record to determine whether, within the past predetermined time period T, at least a specified number of calls have been placed to the primary destination from the location.

Re-direction logic 32 then functions to re-direct to alternate destination 24 a call that would otherwise have been connected to primary destination 22. Redirection logic is preferably invoked in response to a determination by call-density logic 30 that a threshold number of calls have already been placed to the primary destination 22 from the location of terminal 16. Re-direction logic directs carrier system 12 to connect such a call to alternate destination 24, rather than to the requested primary destination 22.

In the exemplary embodiment, alternate destination 24 may then apply any desired treatment to the call. For example, alternate destination 24 may announce to the caller (the user of terminal 16) that calls have already been placed to the primary destination 22 from the caller's location. Alternate destination 24 may then give the caller the option to still be connected to the primary destination. To carry out these functions, as shown in FIG. 1, alternate destination 22 preferably includes or has access to (i) alternate-handling logic 34 and (ii) connection logic 36.

Alternate-handling logic 34 functions to interact with the incoming call. Thus, for instance, alternate-handling logic can include an interactive voice response unit ("IVRU") that functions to play voice messages and receive voice or tone (e.g., DTMF) input from the caller at terminal 16. The IVRU can play a message to the caller, such as "We have already received many calls to the number you dialed from your location; if you wish to be connected to the number, please press 1. Otherwise, please hang up." If the caller hangs up, the process is completed. Otherwise, if the IVRU detects the DTMF tone combination corresponding to the number "1", alternate-handling logic may output a signal indicating that the call should be connected to primary destination 22.

In the exemplary embodiment, connection-logic 36, in turn, functions to connect the call to primary destination 22, or more generally to cause the call to be connected to primary destination 22. This can be accomplished in any of a variety of ways. Most simply, for instance, connection logic 36 can itself originate a call via carrier 12 to primary destination 22. (Preferably, carrier 12 would be programmed to not consider such a call to be a call placed to the primary destination, for purposes of applying call-density logic as described above).

Connection-logic would then bridge (i.e., connect) the call from terminal 16 with the call to primary destination 22. Alternatively, connection logic 36 could release the call and signal to carrier 12, to cause carrier 12 to connect the call from terminal 16 to primary destination 22.

Thus, for example, assume that a user at terminal 16 places a call to the primary destination 22. Trigger logic 26 would detect the call request. In response, location-logic 28 would determine that terminal 16 is located at latitude/longitude coordinates h, k. Call-density logic would then query the record of past calls to find out how many calls have been placed to primary destination 22 from a location that falls within radius r of point h, k within the past time period T. If the result is at least a threshold number, then re-direction logic 32 would cause carrier 12 to route the call to alternate destination 24. Alternate destination 24 would then prompt the user to determine whether the user still wants to be connected to primary destination 22. And, if so, connection logic 36 would release the call and signal to carrier 12 to connect the call to primary destination 22. Other examples are possible as well.

As noted above, the present invention is particularly useful to assist in managing emergency services call traffic. More particularly, for example, the invention is useful to manage calls placed from mobile stations to emergency service centers. Typically, to place such a call, a user will dial the digits "911", and a carrier will responsively connect the call to an emergency services network ("ESN") comprised of one or more Public Service Answering Points ("PSAP"), or to a particular PSAP. That destination can be considered the "primary destination" in the description above.

Figure 2:
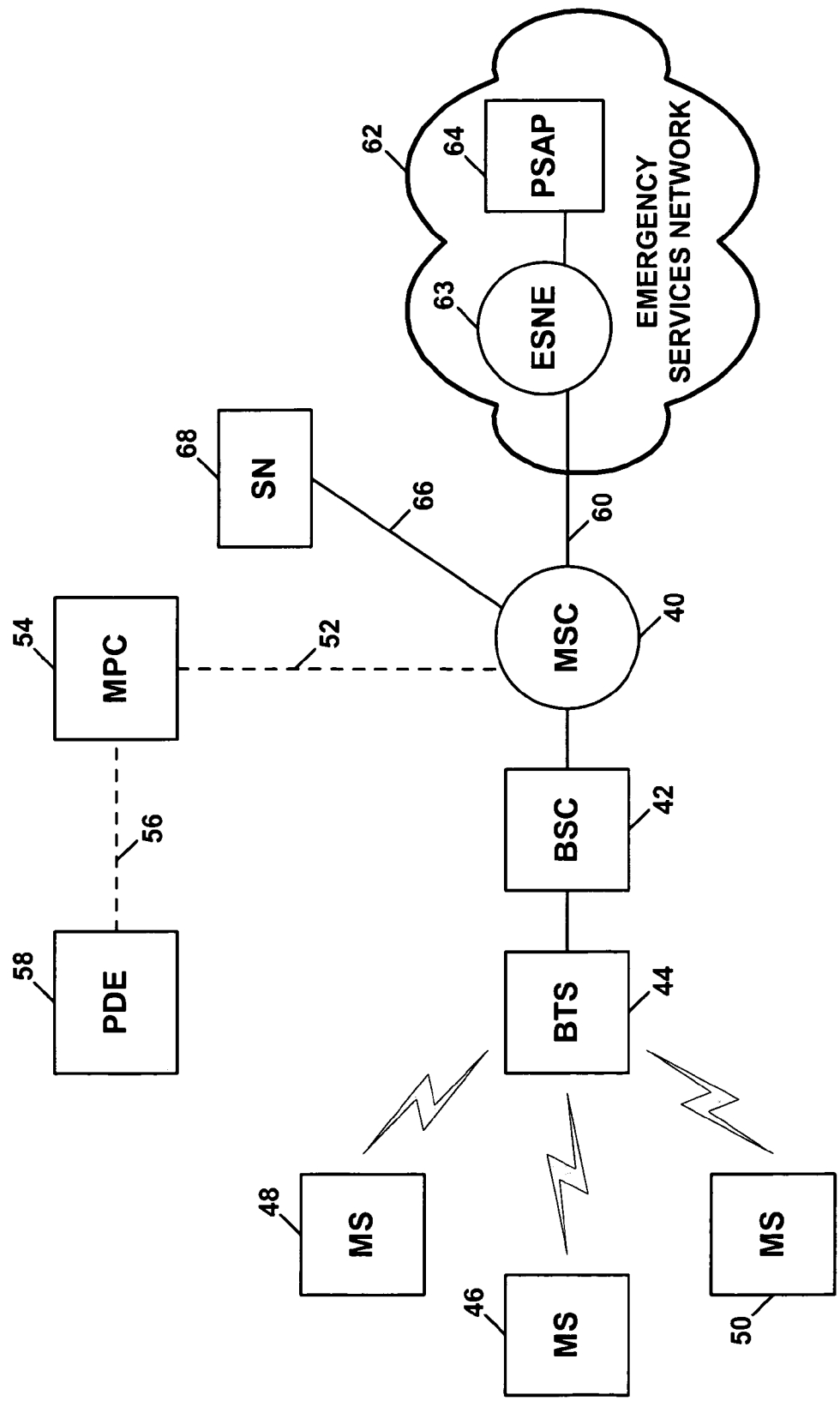
FIG. 2 is a simplified block of a cellular wireless system arranged to implement the exemplary embodiment.

Referring now to FIG. 2, a simplified block diagram is provided to illustrate operation of the exemplary embodiment for managing emergency services call traffic originated from mobile stations. For purposes of example, FIG. 2 depicts a cellular wireless system, which includes an MSC 40 coupled with one or more base station controllers ("BSC") 42. Each BSC is in turn coupled with one or more base transceiver stations ("BTS") 44, and each BTS includes one or more antenna elements arranged to produce a radiation pattern defining a cell and respective sectors. One or more mobile stations ("MS") 46–50 may then operate within a given cell and sector, and each MS may communicate via an air interface with BTS 44, and in turn via the BSC 42 with MSC 40. MSC 40 may thus connect calls between a given MS and other entities.

As further illustrated by way of example, MSC 40 is coupled by a signaling link 52 to a mobile positioning center ("MPC") 54. MPC 52 is then coupled by a signaling link 56 to position determining equipment ("PDE") 58. As defined by J-STD-036, the MPC functions to retrieve, forward, store and control position data, and the PDE functions to determine precise position or geographic location of a mobile station. Further, both MPC 52 and MSC 40 are preferably programmed with an industry standard message set such as that defined by TIA/EIA/IS-41D and J-STD-036, so as to facilitate communication over link 52 between MPC 20 and MSC 40.

MPC 54 can be implemented as one or more computer applications and database functions programmed on an SCP such as the Integrated Service Control Point ("ISCP") made by Telcordia Technologies, Inc. Further, another SCP may be positioned along signaling link 52, so that MSC 40 communicates with the other SCP, and the other SCP in turn communicates with the MPC.

In the exemplary embodiment, MSC 40 is further coupled by a trunk 60 with an emergency services network 62, which includes an Emergency Services Network Entity ("ESNE") 63 and a PSAP 64. ESNE 63 functions effectively as a local exchange carrier ("LEC") switch (such as an SSP) for receiving call traffic into the emergency services network and for routing that call traffic to one or more PSAPs such as PSAP 64. Each PSAP, in turn, may be a 911 center or other point that receives emergency services calls. Thus, ESNE 63 can engage in call-setup signaling so as to set up calls to PSAP 64.

Additionally, MSC 40 is coupled by a trunk 66 with a service platform, represented by service node ("SN") 68 in FIG. 2. SN 68 can be a programmed computer or more complex platform, such as that available from InterVoice-Brite Systems, Inc. of Dallas, Tex. As such, SN 68 can include an IVRU as well as the interfaces and logic necessary to communicate with MSC 40.

In terms of the discussion above with respect to FIG. 1, the emergency services network (or, more particularly ESNE 63 or PSAP 64) may be considered to be the primary destination 22, and SN 68 may be considered to be the alternate destination 24.

In normal operation, a user of a mobile station such as MS 46 can connect with PSAP 64 by dialing the digits "911" and pressing "SEND", "TALK" or another designated key on the mobile station to cause those digits to pass via BTS 44 and BSC 42 to MSC 40. MSC 40 will then receive those dialed digits and begin to process the call. In particular, the MSC will apply a set of call-processing program logic to analyze the dialed digits and to then physically (or logically) connect the call from MS 46 to the dialed destination, PSAP 64.

In accordance with J-STD-036, the call-processing logic will include a trigger point at which the MSC will recognize that the digits dialed are "911" and that the MSC should pause call processing and signal up to MPC 54. The MSC will thus pause call processing and send a signaling message up to MPC 54. Under IS-41 and J-STD-036, this signaling message will be an Origination-Request (ORREQ) message, which will carry as parameters information about MS 16, such as its directory number (mobile identification number ("MIN")) and an indication of whether MS 16 is capable of determining its own position (such as if MS 16 is equipped with a GPS receiver).

When MPC 54 receives the ORREQ, the MPC will relay a position request to PDE 58. PDE 58 will then apply suitable technology to determine the location of MS 46. For example, if MS 46 includes a GPS receiver, PDE 58 may send a signaling message to MS 46 (via MSC 40, BSC 42 and BTS 44), requesting a read on the current position of MS 46, and the MS would respond accordingly. As another example, PDE 58 may apply triangularization or other techniques to identify the location of MS 46. The PDE will then respond to MPC 58, providing MPC 58 with an indication of the position of MS 46.

Depending on the arrangement, MPC 54 may then send an "orreq" response message to MSC 40, providing MSC 40 with the location of MS 46. MSC 40 will then continue call processing, seeking to set up the call with PSAP 64 via ESNE 63. In doing so, according to J-STD-036, MSC 40 will send a call-setup message (e.g., an ISUP Initial Address Message ("IAM")) to the emergency services network, which will carry as a parameter the location of MS 46 returned by MPC 54. Thus, when PSAP 64 receives the call, PSAP 64 will already have an indication of where the caller is located, thereby enabling emergency services personnel to better assist the caller.

Alternatively, when the MPC determines the location of MS 46, the MPC can itself signal to the emergency services network (via an Emergency Services Message Entity ("ESME," not shown), so as to provide PSAP 64 with an indication of the caller's location. And MPC 40 may then send a response to MSC 40. MSC 40 would then connect the call with PSAP 64, and PSAP 64 would associate the location provided by MPC 40 with the call connected from MSC 40, thereby establishing the location of the caller.

In accordance with the exemplary embodiment, MPC 54 will be arranged to maintain a record of 911 calls, indicating for each call the location of the caller and the time of the call. Further, in response to an ORREQ indicating a 911 call request, MPC 54 will be arranged to determine whether a threshold number of 911 calls have already been placed from the location of the caller within the past time period T. If so, MPC 54 will then send an orreq response message to MSC 40, instructing MSC 40 to route the call to SN 68 for alternate processing. Since MPC 54 is typically a program application executed on an SCP, the process of providing this added functionality should be a straightforward revision of the MPC program and/or addition of other program modules as desired.

Conventionally, an IS-41 orreq response message can include a "Routing-Digits" parameter, which functions to instruct an MSC where to route a given call. In the exemplary embodiment, the MPC can use this parameter as a mechanism to cause MSC 40 to route a call to SN 68. In particular, when the MPC detects that a threshold number of 911 calls have already been placed from the location of MS 46 within the past time period T, the MPC will send an orreq response message to the MSC, including as the Routing-Digits parameter an indication of trunk 66, which leads to SN 68. Further, MPC 54 can still provide in the orreq response message an indication of the location of MS 46, as indicated by PDE 58, or MPC 54 can provide that location information to PSAP 64 via an ESME, as described above.

When MSC 40 receives an orreq response message with Routing-Digits pointing to trunk 66, the MSC will responsively seek to set up the call from MSC 40 to SN 68, by that trunk. For instance, MSC 40 will send an IAM to SN 68, seeking to set up the call. MSC 40 may further include in the IAM a parameter indicating the location of MS 46. (Alternatively, MPC 54 could have provided SN with an indication of the caller's location.)

When SN 68 receives the call, SN 68 will then play a message to the user of MS 46, prompting the user to indicate whether the user still wants to be connected to the 911 center. For instance, the SN may play an announcement such as "We have already received many 911 calls from your location; if you are injured, please press any digit or hold for assistance. Otherwise, please hang up immediately." If the caller presses a digit, or if the caller does not hang up after a predetermined time period, the SN may then conclude that the call should still be connected to PSAP 64.

Following the process described above, the SN may then seek to set up the call in turn to PSAP 64. In particular, the SN can send an IAM to MSC 40, asking the MSC to set up the call to PSAP 64, and MSC 40 can responsively send an IAM to ESNE 63, seeking to set up the call to PSAP 64. Further, if SN has been provided with an indication of the location of MS 46, SN 68 can include that indication as a parameter in the IAM message, and MSC can in turn include the indication in its IAM to ESNE 63. Alternatively, if MSC 40 had otherwise been provided with the location of MS 46, MSC 40 can include that indication in its IAM to ESNE 63. Still alternatively, if MPC 54 has provided PSAP 64 with an indication of the caller's location, MSC 40 can simply set up the call from SN 68 to PSAP 64 (via ESNE 63) without providing location information.

Figure 3:
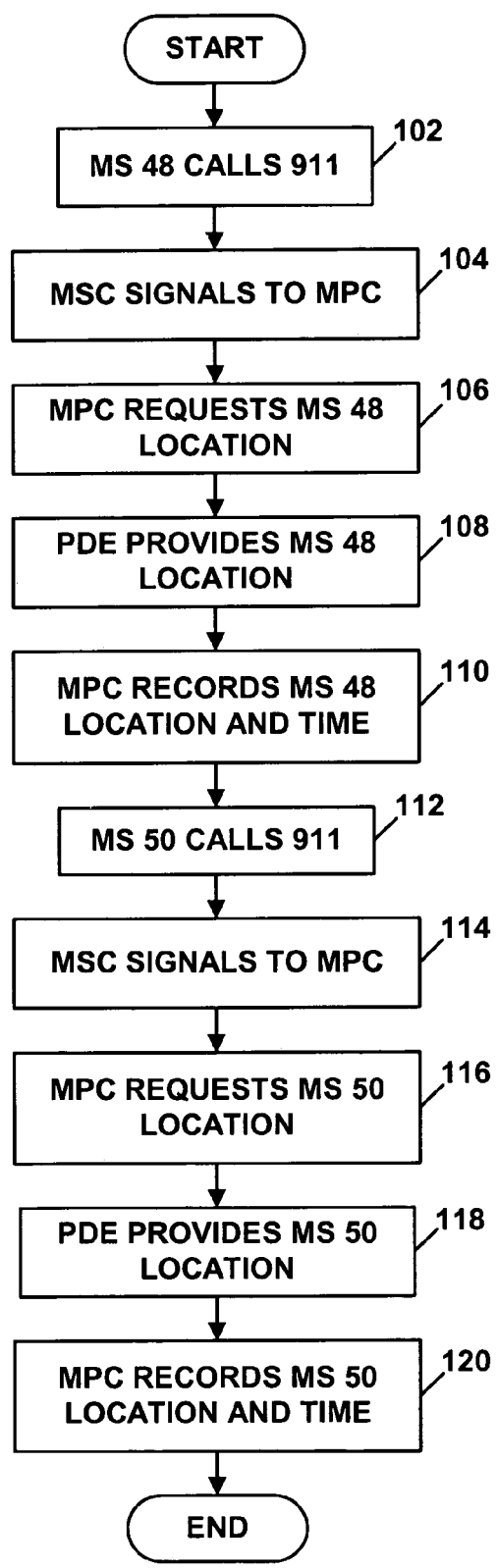
FIG. 3 is a flow chart depicting functions involved in recording originating times and locations of emergency services call in accordance with the exemplary embodiment.
Figure 4:
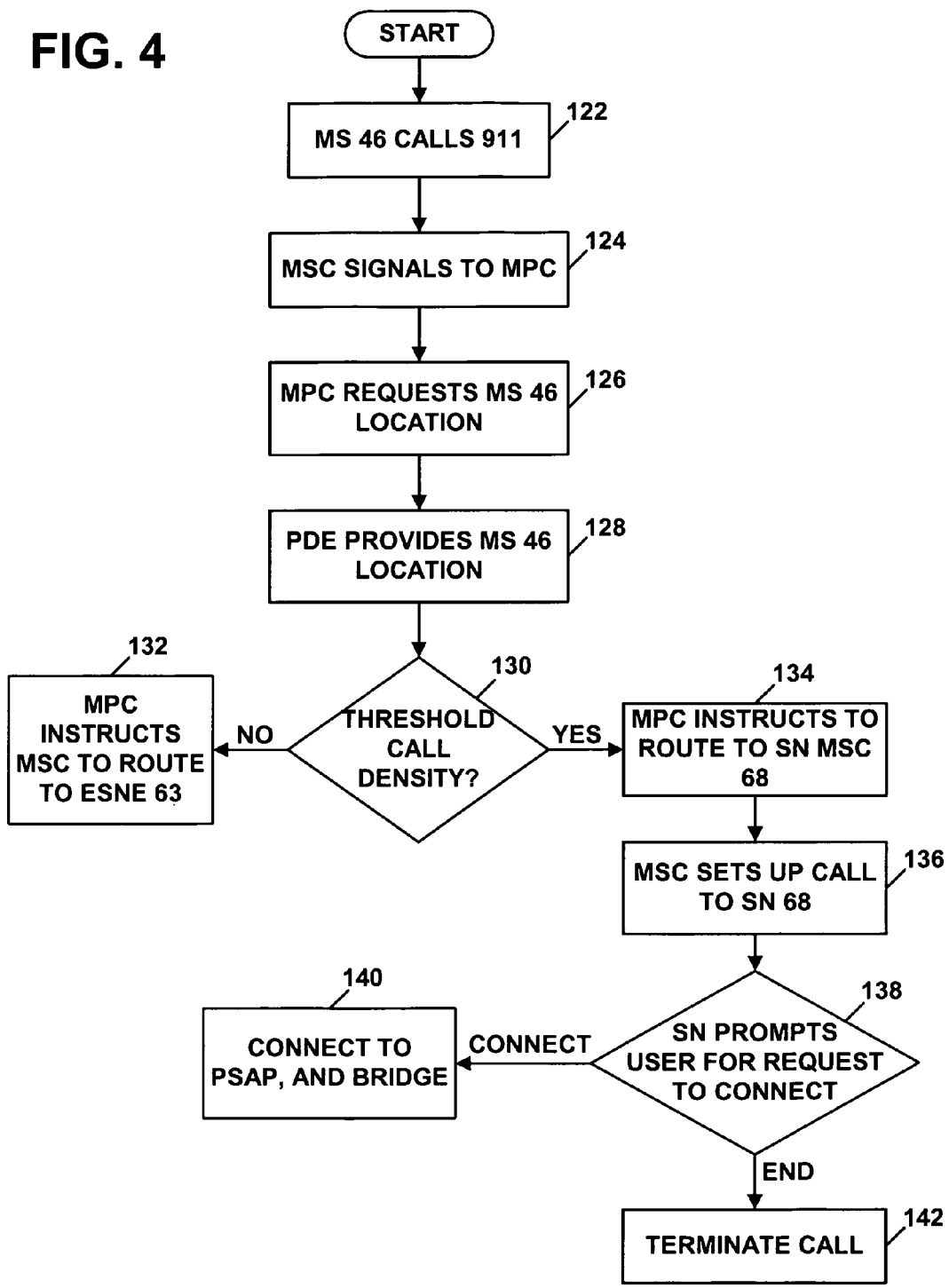
FIG. 4 is a flow chart depicting functions involved in re-directing emergency call traffic in accordance with the exemplary embodiment.

Thus, referring now to FIGS. 3 and 4, flow charts are provided to help illustrate a process for managing emergency services call traffic in accordance with the exemplary embodiment. As noted above, variations on the functions and order shown in these flow charts are possible.

FIG. 3 depicts a set of functions involved with keeping a record of the time and location of 911 calls. FIG. 3 proceeds with respect to calls placed from the three mobile stations shown in FIG. 2, by way of example.

As shown in FIG. 3, at block 102, assume a user of MS 48 calls 911, by dialing "911" and pressing "SEND". At block 104, MSC 40 receives the dialed digits "911" and encounters a trigger, which causes the MSC to send an ORREQ up to MPC 54. At block 106 MPC 54 then signals to PDE 58 to obtain the location of the MS 48, and, at block 108, PDE 58 provides MPC 54 with an indication of the location of MS 48. In accordance with the exemplary embodiment, at block 110, MPC 54 then records the location of MS 48, as well as the current time of the 911 call, in a database record.

At block 112, assume a user of MS 50 then calls 911. Similarly, at block 114, MSC 40 thus receives the dialed digits and sends an ORREQ up to MPC 54. At block 116, MPC 54 signals to PDE 58 to obtain the location of the MS 50, and, at block 118, PDE 58 provides MPC 54 with an indication of the location of MS 50. At block 120, MPC 54 then records the location of MS 50 and the time of the 911 call in a database record.

As other mobile stations call 911 calls, this process would proceed similarly. Thus, the MPC can build up a database table, in which each record specifies (i) the time of a call to 911, (ii) the location of the call, and (iii) the MIN of the originating MS. The MPC can be arranged to periodically delete old records from the table but to maintain each record in the table for at least a time period T.

Further, in accordance with the exemplary embodiment, an administrator workstation or display console coupled with MPC (or otherwise with access to the database) could be programmed to access the database in real time and to present a dynamic pin map showing the locations of the 911 calls. Each dot on the pin map could remain for T minutes to reflect a 911 caller's location, after which the dot would disappear from the map.

FIG. 4 next depicts a set of functions that are involved in re-directing 911 call traffic after a threshold number of 911 calls are placed from a given location. As shown in FIG. 4, at block 122, assume a user of MS 46 calls 911. At block 124, MSC 40 thus receives the dialed digits and sends an ORREQ up to MPC 54. At block 126, MPC 54 then signals to PDE 58 to obtain the location of MS 46, and, at block 128, PDE 58 responds with an indication of the location of MS 46, as location coordinates h, k. At block 130, MPC 54 then queries the database table described above, to determine whether a threshold number of emergency services calls have been placed within the past time period T from location coordinates x, y that satisfy the equation set forth above.

If the threshold is not met, then, at block 132, the MPC proceeds as normal, such as by sending an orreq to MSC 40 that causes MSC 40 to normally send an IAM to ESNE 63 in an effort to set up the call to PSAP 64. Alternatively, if the threshold is met, then, at block 134, the MPC instead sends a orreq to MSC 40 that includes Routing-Digits pointing to SN 68 and that specifies the location of MS 46. Thus, at block 136, MSC 40 would set up the call to SN 68, sending to SN 68 an IAM that specifies the location of MS 46.

Once the call is connected to SN 68, at block 138, SN 68 would prompt the user to indicate whether the user still wants to be connected to the 911 center, and the SN would await a response. At block 140, in response to a user indication that the user still wants to be connected to the 911 center, SN 68 would set up the call to PSAP 64, providing PSAP 64 with an indication of the location of MS 46. In particular, SN 68 would send an IAM to MSC 40, including in the IAM an indication of the location of MS 46, and MSC 40 would then forward that IAM to ESNE 63, which would in turn convey the information to PSAP 64. After appropriate acknowledgements, the call would then be connected, and SN 68 would bridge the call together with the call from MS 46.

Alternatively, at block 142, in response to a user indication that the user does not want to be connected to the 911 center (such as by hanging up for instance), SN 68 will terminate the call, thereby preventing the call from reaching the 911 center.

The exemplary embodiment described above thus enables a wireless carrier to manage emergency services call traffic (or, more generally, traffic to a particular destination, whether or not for emergency purposes). The carrier would typically own and operate the MSC 40, the MPC 54 and the SN 68 (although one or more other companies could own and operate one or more of these entities instead). Therefore, the carrier can monitor the numbers and originating locations of calls that are placed through its carrier network to the emergency services network. And by redirecting calls to an alternate destination for handling as described above, the carrier can then help to avoid overburdening the emergency services network.

In some instances, however, more than one carrier may serve mobile subscribers in a given area. In that event, each carrier that performs the method described above with respect to calls placed by its own subscribers can, respectively, help to ease the burden on the emergency services network. However, if the method is performed separately by each carrier without regard to calls placed through other carriers, the total number of 911 calls placed from a given location (through multiple carriers) might not be considered, and the emergency services network might still be overburdened.

According to the exemplary embodiment, one way to overcome this problem is to consolidate the analysis above for calls placed through multiple carriers. For example, a common MPC can be put in place to be accessed by all carriers serving a given area. MPC 54 can be this common MPC. With this arrangement, each carrier could apply its own trigger logic to detect a 911 call and can then signal up to the common MPC for call handling instructions. The common MPC can then log the originating locations of the calls and can apply the call-density logic as described above for all of the 911 calls that it processes. Further, each carrier can have its own service platform that functions as the alternate destination for 911 calls, or carriers can also share a common service platform for that purpose.

As another example, another central server (akin to a common MPC) can be provided to log call locations and/or to perform call-density logic for calls originating from multiple carriers. Thus, for instance, each carrier can program its respective MPC (or simply an SCP) to signal to the central server when a 911 call is being placed, so that the central server can keep track of the originating locations of those calls from multiple carriers. For any given 911 call attempt via a given carrier, the central server can then determine whether more than a threshold number of 911 calls have already been placed from the same originating location. And, if so, the central server can instruct the given carrier to redirect the call to an alternate destination.

Such a central server may take a variety of forms. For instance, the central server may take the form of a selective router or switch that has logic in it to route calls. The selective router or switch might sit within the emergency services network, for instance, and might function to route calls from various carriers to a PSAP.

An exemplary embodiment of the present invention has been described above. Those skilled in the art will understand, however, that changes and modifications may be made to the embodiment without departing from the true scope and spirit of the present invention, which is defined by the claims.

For example, although the foregoing description refers to setting up calls using ISUP signaling, it should be understood that other methods are possible as well. For instance, call setup signaling could instead be SIP-based. Further, call traffic (or, more generally, bearer traffic) could be sent via any link, whether packet-switched (e.g., RTP traffic) or circuit-switched (e.g., TDM traffic).

As another example, although the foregoing describes separate MPC and SN entities, some or all of the functions of the SN can be incorporated into the MPC. For instance, when the MPC determines that more than a threshold number of calls have been placed to a destination from a common originating location, the MPC itself can communicate with a user of the originating terminal (via any suitable messaging scheme, such as SMS messaging, web messaging, etc.) to alert the user that a number of calls have already been placed to the destination, and to ask the user whether the user still wants to be connected to the destination. If the user opts to still connect the call to the destination, the MPC can proceed as normal, directing the MSC to connect the call. Otherwise, the MPC can direct the MSC to end the call.

Other examples are possible as well.

I claim:

1. A method of managing call traffic comprising:
    maintaining records of calls to a destination, wherein each of the records includes a respective caller location;
    receiving a request to connect a subsequent call from an originating station to the destination;
    referring to the records to make a determination that at least a threshold number of the calls to the destination have originated from an area where the originating station is located; and
    in response to the determination, routing the subsequent call to a service platform for alternative treatment.

2. The method of claim 1, wherein the originating station comprises a mobile station.

3. The method of claim 1, wherein the destination comprises an emergency services network.

4. The method of claim 1, further comprising:
    sending an announcement from the service platform to the originating station, advising that calls have been received from the area.

5. The method of claim 1, further comprising:
    sending from the service platform to the originating station a query asking whether the subsequent call should still be connected to the destination;
    receiving at the service platform from the originating station a response indicating that the subsequent call should still be connected to the destination; and
    responsive to the response, connecting the subsequent call to the destination.

6. The method of claim 5, wherein connecting the subsequent call to the destination comprises:
    placing an additional call from the service platform to the destination; and
    bridging the subsequent call with the additional call.

7. The method of claim 5, wherein connecting the subsequent call to the destination comprises:
    releasing the subsequent call from the service platform; and
    reconnecting the subsequent call to the destination.

8. A communication system comprising:
    a record of originating locations of calls connected to a primary destination;
    trigger logic executable by a processor to detect a request to connect a subsequent call from an originating terminal to the primary destination, the originating terminal being at a location;
    call-density logic executable by a processor to refer to the record to determine whether a threshold number of the calls have been placed to the primary destination from the location; and
    re-direction logic executable by a processor to re-direct the subsequent call to a secondary destination in response to a determination that a threshold number of the calls have been placed to the primary destination from the location.

9. The communication system of claim 8, wherein the trigger-logic provides a signal in response to detection of the request, the system further comprising:
    location-logic executable by a processor, in response to the signal, to determine the location of the originating terminal.

10. The communication system of claim 8, wherein:
    the trigger-logic is executed in a switch.

11. The communication system of claim 8, wherein the call-density logic and re-direction logic are both executed in a service control point.

12. The communication system of claim 8, wherein a user operates the originating terminal to make the request to connect the subsequent call from the originating terminal to the primary destination, the system further comprising:
    alternate-handling logic executable by a processor, upon connection of the subsequent call to the secondary destination, to report to the user that calls to the primary destination have already been received from the location.

13. The communication system of claim 8, wherein a user operates the originating terminal to place the request to connect the subsequent call from the originating terminal to the primary destination, the system further comprising:
    alternate-handling logic executable by a processor, upon connection of the subsequent call to the secondary destination, to ask the user whether the user still wants the subsequent call to be connected to the primary destination.

14. The communication system of claim 13, further comprising:
    connection-logic executable by a processor, in response to an indication by the user that the user still wants the subsequent call to be connected to the primary destination, to cause the subsequent call to be connected to the primary destination.

15. The communication system of claim 14, wherein:
    the connection-logic places an additional call to the primary destination; and
    the connection-logic bridges the subsequent call with the additional call.

16. A method of managing emergency service calls, the method comprising:
    maintaining records of emergency service calls, wherein each of the records includes a respective caller location;
    receiving a request to connect a subsequent call from a mobile station to an emergency service center;

referring to the records to make a determination that at least a threshold number of the emergency service calls have originated from an area where the mobile station is located; and in response to the determination, routing the subsequent call to a service node for alternate treatment.

17. The method of claim 16, further comprising:
receiving the subsequent call at the service node;
operating the service node to notify a user of the mobile station that emergency service calls have already been placed from the area.

18. The method of claim 17, further comprising:
after notifying the user that emergency service calls have already been placed from the area, operating the service node to prompt the user for an indication that the user still wants to be connected to the emergency service center;
detecting the indication; and
in response to the indication, connecting the subsequent call to the emergency service center.

19. The method of claim 18, wherein the indication comprises a DTMF signal established at the mobile station.

20. The method of claim 16, wherein making a determination that at least a threshold number of the emergency service calls have originated from an area where the mobile station is located comprises:
determining a location of the mobile station;
determining a number of the emergency service calls that have been placed from an area encompassing the location with a past predetermined time period; and
determining that the number exceeds a predetermined threshold.

21. The method of claim 20, wherein the area is defined by a predefined radius distance from the location of the mobile station.

22. The method of claim 20, wherein determining the location of the mobile station comprises:
applying position determining equipment.

23. The method of claim 16, further comprising:
applying a service control point to make the determination that at least a threshold rate of emergency service calls have originated from an area where the mobile station is located.

24. The method of claim 16, wherein each of the records includes a respective call time.

25. A communication system comprising:
a record of originating locations and times of calls connected to a primary destination;
trigger logic executable by a processor to detect a request to connect a subsequent call from an originating terminal to the primary destination, the originating terminal being at a location;
call-density logic executable by a processor to refer to the record to determine whether a threshold number of the calls have been placed to the primary destination from the location within a predetermined time period; and
re-direction logic executable by a processor to re-direct the subsequent call to a secondary destination in response to a determination that a threshold number of the calls have been placed to the primary destination from the location within the predetermined time period.

26. A method of managing emergency service calls, the method comprising:
maintaining records of emergency service calls, wherein each of the records includes a respective caller location and a respective call time;
receiving a request to connect a subsequent call from a mobile station to an emergency service center;
referring to the records to make a determination that at least a threshold number of the emergency service calls have originated from an area where the mobile station is located within a predetermined time period; and
in response to the determination, routing the subsequent call to a service node for alternate treatment.

* * * * *